ated Apr. 5, 1960

2,931,817
STEROID SULFITE ESTER POLYMERS

Virgil W. Gash and Bernard S. Wildi, Dayton, Ohio, assignors to Monsanto Chemical Company, St. Louis, Mo., a corporation of Delaware No Drawing. Application May 31, 1956
Serial No. 588,240

9 Claims. (Cl. 260—397.5)

The present invention is directed to novel steroid sulfite ester polymers, and to methods of preparing these polymers.

An object of the present invention is to modify the physical properties of steroid compounds by converting the steroid compounds into polymeric materials which in general have increased stability and decreased solubility, compared to the starting steroids. A further object is to provide therapeutically active steroids in a form in which they can be slowly hydrolyzed or otherwise converted in biological systems to their ordinary form, in order to have therapeutic agents characterized by a more protracted and persistent action.

The polymeric steroids of our invention are steroid sulfite ester polymers which can be represented by the formula:

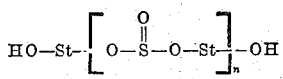

in which $n$ is at least 2 and can be any integer from 2 up to 10 or more. It is usually preferred that $n$ be in the range of 3 to 6, whereby about 4 to 7 bivalent steroid radicals are linked together in the polymer, such steroid radicals being represented by St in the above formula. St is considered as representing any bivalent cyclopentanopolyhydrophenanthrene radical. Some of the more therapeutically useful polymers are those in which St is a divalent cyclopentanopolyhydrophenanthrene structure as represented by:

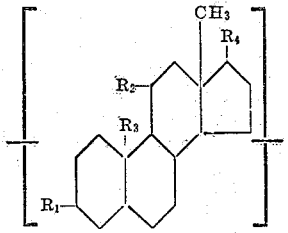

wherein $R_1$ and $R_2$ are selected from the group consisting of hydrogen, hydroxy, ketonic oxygen and an acyloxy group of the formula AcO wherein Ac represents the acyl radical of an organic carboxylic acid containing from 1 to 8 carbon atoms inclusive, and wherein $R_3$ is selected from hydrogen and methyl; $R_4$ is hydrogen, ketonic oxygen, hydroxyl or one of the common streoid side chains; the indicated cyclopentanopolyhydrophenanthrene structure may also have double bonds located at various positions in the molecule and the A and B rings may be aromatic. A $\Delta^4$-3-keto group is common in such therapeutically active steroids. Moreover, the $\Delta^5$-3-acyloxy or -3-hydroxy grouping is often present. In addition, the indicated cyclopentanopolyhydrophenanthrene can be of the normal or allo configuration and can have other substituents such as hydroxyl, acyloxy, ketonic oxygen, halo, ketal, and the like at positions in the molecule other than those indicated. In the acyl-oxy groups, AcO, Ac is the acyl radical of an organic carboxylic acid such as, for example, formic, acetic, propionic, butyric, valeric, hexanoic, heptanoic, octanoic, benzoic or the like. The indicated structure can have the common 17-side chains as $R_4$, e.g., $CH_3CO$—,

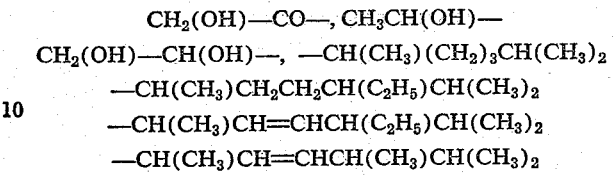

$CH_2(OH)$—$CO$—, $CH_3CH(OH)$—

$CH_2(OH)$—$CH(OH)$—, —$CH(CH_3)(CH_2)_3CH(CH_3)_2$

—$CH(CH_3)CH_2CH_2CH(C_2H_5)CH(CH_3)_2$

—$CH(CH_3)CH=CHCH(C_2H_5)CH(CH_3)_2$

—$CH(CH_3)CH=CHCH(CH_3)CH(CH_3)_2$ etc.; of these side chains, those containing up to two carbon atoms are most useful. The solid bond lines in the indicated structure should not be considered as limiting stereochemical configuration, as the bonds can be of alpha- or beta-configuration; ordinarily, the configurations will be the natural or active configurations for the particular steroid.

Our steroid sulfite ester polymers are produced by reacting a dihydroxy steroid with a thionyl halide. By a dihydroxy steroid is meant a cyclopentanopolyhydrophenanthrene compound containing at least two free hydroxyl groups. Moreover, the required free hydroxyl groups must be located on non-tertiary carbon atoms, i.e., on carbon atoms which are joined to no more than two other carbon atoms. The tertiary carbon hydroxyl groups, e.g., those at ring junctions, are subject to removal under dehydrating conditions and are therefore not suitable for the present ester forming reaction, although polymeric steroid sulfite esters in which the sulfite ester groups are connected to the 5- or other tertiary carbon atoms have the desired polymeric steroid properties if prepared by other methods. Such dehydration reactions to produce double bonds may not be disadvantageous if there are two other hydroxyl groups in the steroid molecule to take part in the polymer forming reaction and in fact, dehydration may not take place at all if the other hydroxyl groups are readily esterifiable.

Suitable thionyl halides for the present procedure are thionyl chloride, thionyl bromide, and thionyl fluoride; the thionyl chloride, $SOCl_2$, is ordinarily preferred.

A generally useful procedure for the reaction is to dissolve about 0.5 to 1 gram of the dihydroxy steroid in 10 ml. of organic solvent, in the presence of a tertiary amine, and to slowly add a stoichiometric amount (mole/mole) or a slight excess over the stoichiometric amount of thionyl chloride, and after allowing the reaction mixture to stand for a minute or so, adding additional thionyl chloride to insure complete reaction of the steroid. It is usually desirable to have an amount of tertiary amine at least sufficient to neutralize the liberated HCl.

The following examples set forth certain specific embodiments of the invention.

Example 1

Alpha-estradiol i.e., 1,3,5-estratriene-3,17α-diol, is a known compound of melting point 178° C. One gram of alpha-estradiol was dissolved in 10 ml. dry pyridine. Thionyl chloride, 0.3 ml., was added dropwise (at room temperature) and after 2 minutes an additional 0.5 ml. of thionyl chloride was added. After standing for 2 minutes, the reaction mixture was poured into water, and the resulting precipitate was removed by filtration. The precipitate was washed with water and dried. After being washed with methanol, the polymeric sulfite ester product weighed 0.8 gram. The product softens at 140° C., foams at 150–170° C., and decomposes at 200–210° C., the product is liquid at 190 to 200° C. The polymeric sulfite ester of estradiol gave a negative test for halogen, and the following elementary analysis: Found—C, 69.56; H, 8.07; S, 7.31. This corresponds fairly closely to the calculated analysis for $C_{72}H_{90}O_{11}S_3$: C, 70.4; H, 7.39; S, 7.84, indicating that the polymer contains about 4 of the estradiol units:

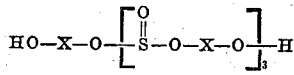

in which X represents the structure:

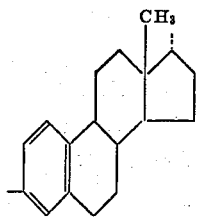

Infrared analysis indicated a hydroxyl at 2.97μ, and aromatic absorption at 1608 cm.$^{-1}$, 1580 cm.$^{-1}$, and 1487 cm.$^{-1}$, the intensities being 1487 cm.$^{-1}$ ≫ 1608 cm.$^{-1}$ > 1580 cm.$^{-1}$, and also showed a band at 1207 cm.$^{-1}$ indicating a sulfur-oxygen linkage. Ultraviolet analysis showed a max at 279 mμ with shoulders on each side of the max at 286 mμ and 273 mμ.

The polymeric sulfite ester of alpha-estradiol was insoluble in water, methyl alcohol, ethyl alcohol, t-butanol, and acetone. This insolubility in common solvents is in marked contrast to alpha-estradiol, which is very soluble in methyl alcohol, ethyl alcohol, acetone, etc., and is soluble in toluene and various other organic solvents. The polymeric sulfite ester of alpha-estradiol exhibits estrogenic activity similar to that of alpha-estradiol, and can be used in applications where a more prolonged effect is desired.

Example 2

Hydrocortisone is reacted with thionyl chloride in pyridine solution according to the procedure of Example 1 to produce a sulfite ester polymer containing hydrocortisone units linked by sulfite ester linkages, the polymer being insoluble in water and most of the common organic solvents. The polymer can be used as an antirheumatic, and in other applications for steroids of cortisone-like activity.

Example 3

Estradiol-17β is reacted with thionyl chloride under the conditions of Example 1 to produce a polymer having properties similar to the polymer of Example 1.

Example 4

Alpha-estradiol, 1 gram, is dissolved in 15 ml. dry pyridine. Thionyl chloride, 0.15 ml. is added dropwise and the reaction mixture is permitted to stand 10 minutes, and the product is then worked up according to the procedure of Example 1 to give a similar resinous solid.

Example 5

Androstanediol-3α,17β is reacted with thionyl chloride according to the procedure of Example 1 to produce a low melting polymer of fairly low molecular weight. The polymer can be used in various applications for materials having androgenic activity.

The steroids for use in our polymer forming reaction can have hydroxyl groups located on any of the nuclear or side-chain carbon atoms so long as there are two or more hydroxyl groups on non-tertiary carbon atoms, i.e., primary or secondary carbon atoms. It will be noted that in the estradiol molecule, the hydroxyl on the unsaturated A-ring is a phenolic hydroxyl, while the hydroxyl on the D-ring is an alcoholic hydroxyl, thereby indicating that either type hydroxyl can be esterified in the present reaction to form our steroid sulfite ester polymers. Steroids containing more than two hydroxyl groups can be used in our reaction, e.g., a trihydroxy steroid can be reacted to produce a polymer in which the steroid units are a mixture of di- and tri-esterified steroids, or to produce a polymer in which substantially all of the steroid units are tri-esterified. Of course, polymeric steroid sulfite esters in which the steroid residues contain free hydroxyl groups can be prepared by reacting a dihydroxy steroid compound which also contains a masked hydroxyl group, e.g., an acyloxy group, with thionyl chloride, and subsequently regenerating the hydroxyl group by removing the protecting group through known procedures.

Among the more common hydroxyl groups which can be esterified by thionyl chloride in the polymer forming reaction of the present invention are 3α-hydroxyl, 3β-hydroxyl, 11α-hydroxyl, 11β-hydroxyl, 17α-hydroxyl, 17β-hydroxyl, 20-hydroxyl, and 21-hydroxyl. Some of the more preferred combinations of the hydroxyl groups are the 3- and 17-hydroxyls, the 3- and 21-hydroxyls, the 11- and 21-hydroxyls, and the 3- and 11-hydroxyls.

A few examples of polymeric steroids of the present invention are those represented by the formula:

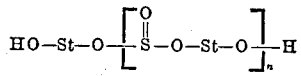

in which $n$ is any integer from 2 to 10, and St is the residue of one of the following steroid diol compounds (the positions of the sulfite ester linkages on the residues in the polymer are designated by "sulfite"): Δ⁵-pregnenediol-3α,20α 3,20-sulfite, alpha-estradiol 3,17α-sulfite, pregnane-3α,21-diol-20-one 3α,21-sulfite, Δ⁵-androstene-3β, 17β-diol 3β,17β-sulfite, estradiol 3,17β-sulfite, corticosterone 11,21-sulfite, 17-hydroxylcorticosterone 11,21-sulfite, Δ⁵-pregnen-11,20-dione-3,17α,21-triol 3,21-sulfite, 17-hydroxydesoxycorticosterone 17.21-sulfite, 9α-fluoro-17-hydroxycorticosterone 11,21-sulfite, Δ¹,⁴-pregnene-11α, 17α,21-triol-3,20-dione 11α,21-sulfite, Δ¹,⁴-pregnene-11, 17α,21-triol 17α-acetate, 11,21-sulfite, Δ⁵-pregnene-3,17α, 21-triol-11,20-dione 17α-benzoate, 3,21-sulfite, androstandiol-3α,17β,3α,17β-sulfite, Δ⁵-pregnene-3,20-diol 3,20-sulfite, pregnane-3,20-diol 3,20-sulfite, etc.

In the present invention, a dihydroxy steroid having therapeutic activity is converted into a more insoluble form through formation of a steroid polysulfite ester polymer. Of course, the therapeutic activity of the polymer will usually be dependent upon the therapeutic activity of the original dihydroxy steroid. Thus, the polysulfite ester polymers formed from steroids of estrogenic activity, e.g., alpha-estradiol, will have estrogenic activity, while the corresponding polymers from steroids of the corticosterone group, e.g., from hydrocortisone, will have cortisone-like activity, and such polymers formed from steroids of androgenic activity, e.g., from androstanediol, will have androgenic activity. In general, the polymers are low melting, resinous solids. In some cases the polymer will also have useful properties not shown by the parent sterol.

Among the steroids to which our invention is applicable are the sexual hormones, the adrenal estrogenic hormones, the adrenal cortical hormones, and various other steroids of known androgenic, spermatogenic, analgesic, antirheumatic, antirachitic, progestational, or other therapeutic activities.

While the present specification specifically teaches many therapeutically active steroids which can be used in the preparation of steroid sulfite ester polymers, it will be apparent to those skilled in the art that the invention can be applied to many other steroids of known therapeutic activity. All such applications to other therapeutic steroids are considered within the purview of our invention.

The proportions in which the dihydroxy steroids and thionyl chloride can be reacted in our process can be varied considerably. Ordinarily it is desirable to add the thionyl chloride to the steroid, thereby having the steroid present in excess; however, the proportions of the total amounts of the reactants used can vary, for example, from about 0.5 to 4 moles of thionyl chloride for each mole of steroid. Approximately stoichiometrically equivalent amounts are satisfactory, e.g., 1.5 to 2.5 moles of thionyl chloride for 2 moles of steroid.

It is ordinarily desirable to conduct the reaction in the presence of a base which will neutralize the liberated hydrogen chloride, e.g., in the presence of tertiary amines such as triethylamine, pyridine, collidine, picoline, etc. Such tertiary amines are conveniently used as the solvent medium, although other organic solvents can also be used, e.g., benzene, toluene, and other aromatic solvents; hexane, petroleum ether and other alkanes; chloroform and other halogenated hydrocarbons; and, in fact, any organic solvents which do not contain active hydrogen atoms. It is usually desirable to conduct the reaction in fairly dilute solution in order to have a polymer of several steroid units formed before the polymer precipitates out of solution. For example, solutions containing about 0.1 to 20 or more grams of steroid for 100 ml. of solution can be used, although it is not usually desirable to use more than 10 grams steroid per 100 ml. solution.

Our polymer-forming reaction is ordinarily conducted at room temperature, although other temperatures may be used, e.g., −10° C. to 40° C. In some cases it will be desirable to conduct the reaction below room temperature, e.g., at 0° C. as when reacting steroids which are readily subject to dehydration by the thionyl chloride because of the location of the hydroxyl groups in the steroid molecule.

While the steroid sulfite ester polymers are represented in the formulae above as having steroid hydroxyl end groups, in actuality there may be a substantial number of

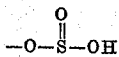

end groups in the molecule. Our polymers have the desired properties, regardless of the actual identity of the end groups. Our polymers have at least three steroid residue units; it is necessary to have at least three such units in order to obtain polymeric properties, rather than the properties of simple di-steroid sulfite esters.

The starting dihydroxy steroids can be readily regenerated from our polymeric steroid sulfite esters by ordinary hydrolysis procedures, e.g., by heating the polymer with caustic alcohol.

Steroid sulfite ester polymers and methods of preparing such polymers have been described. The steroid sulfite ester polymers are insoluble in common organic solvents.

We claim:

1. The method of preparing a steroid sulfite ester polymer which comprises reacting a dihydroxysteroid containing 2 hydroxyl groups attached to the non-tertiary carbon atoms at the 3- and 17α-positions, in dilute solution in an organic solvent, with a thionyl halide, 0.5 to 4 moles of thionyl halide for each mole of steroid, and separating the resulting polymer containing at least three steroid residues from the reaction mixture.

2. The method of claim 1 in which a tertiary amine is present during the reaction and in which the thionyl halide is thionyl chloride.

3. The method of preparing a steroid sulfite ester polymer which comprises forming a dilute solution of a 3,17α steroid in a pyridine solvent, the hydroxyl groups of said steroid being attached to non-tertiary carbon atoms and said steroid being a cyclopentanopolyhydrophenanthrene selected from the group consisting of androgenic, estrogenic, antirheumatic, and antirachitic cyclopentanopolyhydrophenanthrenes, slowly adding an approximately stoichiometrically equivalent amount of thionyl chloride to the solution at about room temperature and allowing the solution to stand until reaction is complete, and separating a linear steroid sulfite ester polymer containing 3 to 10 steroid residues.

4. The method of claim 1 in which the steroid has estrogenic activity.

5. The method of claim 1 in which the steroid is 1,3,5-estratriene-3,17α-diol.

6. A steroid sulfite ester having recurring structural units of the formula:

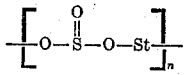

in which St is the bivalent residue of 1,3,5-estratriene-3,17α-diol and the unsatisfied valences are attached to groups such that the end groups of the polymer are selected from the group consisting of —StOH and

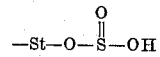

and there are 3 to 10 such residues in the polymer, and $n$ is an integer.

7. The method of preparing a polymer which comprises forming a dilute solution of 1,3,5-estratriene-3,17α-diol in a pyridine solvent, slowly adding an approximately stoichiometrically equivalent amount of thionyl chloride to the solution at about −10° C. to about 40° C., and separating the resulting polymer.

8. A therapeutically active linear steroid sulfite ester polymer in which the bivalent steroid units are linked together by sulfite ester linkages as represented by:

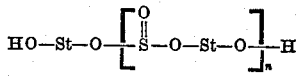

in which $n$ is an integer from 2 to 10 and St is a residue selected from the group consisting of the following steroids in which the positions of attachment of the sulfite ester linkages in the polymer are designated by the term, sulfite: Δ⁵-pregnenediol-3α,20α 3,20-sulfite, 1,3,5-estratriene-3,17α-diol 3,17α-sulfite, pregnane-3α,21-diol-20-one 3α,21-sulfite, Δ⁵-androstene-3β,17β-diol 3β,17β-sulfite, estradiol 3,17β-sulfite, corticosterone 11,21-sulfite, 17-hydroxydesoxycorticosterone 17,21-sulfite, Δ¹,⁴-pregnene-11,17α,21-triol 17α-acetate, 11,21-sulfite, Δ⁵-pregnene-3,17α,21-triol-11,20-dione 17α-benzoate, 3,21-sulfite, androstandiol-3α,17β 3α,17β-sulfite, Δ⁵-pregnene-3,20-diol 3,20-sulfite, pregnane-3,20-diol 3,20-sulfite.

9. The method of preparing a steroid sulfite ester polymer which comprises reacting a dihydroxysteroid containing 2 hydroxyl groups attached to non-tertiary carbon atoms, in dilute solution in an organic solvent with 0.5 to 4 moles of a thionyl chloride for each mole of dihydroxy steroid, the said dihydroxysteroid being selected from the group consisting of Δ⁵pregnene-diol-3α,20α, 1,3,5-estratriene-3,17α-diol, pregnane-3α,21-diol-20-one, Δ⁵-androstene-3β,17β-diol, estradiol, Δ¹,⁴-pregnane-11,17α,21-triol 17 acetate, Δ⁵-pregnene-3,17α,21-triol-11,20-dione 17α-benzoate, corticosterone, androstandiol-3α,17β, Δ⁵-pregnene-3,20-diol, pregnane-3,20-diol.

References Cited in the file of this patent

UNITED STATES PATENTS

| | | |
|---|---|---|
| 2,183,589 | Reichstein | Dec. 19, 1939 |
| 2,381,073 | Mieschen | Aug. 7, 1945 |
| 2,409,798 | Reichstein | Oct. 22, 1946 |
| 2,636,042 | Salkin | Apr. 21, 1953 |

UNITED STATES PATENT OFFICE
CERTIFICATE OF CORRECTION

Patent No. 2,931,817            April 5, 1960.

Virgil W. Gash et al.

It is hereby certified that error appears in the above numbered patent requiring correction and that the said Letters Patent should read as corrected below.

Column 5, line 67, for "3,17α steroid" read -- 3,17α dihydroxy steroid --; column 6, line 12, for "steroid sulfite ester" read -- steroid sulfite ester polymer --.

Signed and sealed this 2nd day of April 1963.

(SEAL)
Attest:

ESTON G. JOHNSON
Attesting Officer

DAVID L. LADD
Commissioner of Patents